United States Patent [19]

Lawrence

[11] 4,326,803

[45] Apr. 27, 1982

[54] THIN FILM LASER GYRO

[75] Inventor: Anthony W. Lawrence, Walpole, Mass.

[73] Assignee: Northrop Corporation, Los Angeles, Calif.

[21] Appl. No.: 77,381

[22] Filed: Sep. 20, 1979

[51] Int. Cl.³ ............................................. G01C 19/64
[52] U.S. Cl. .................................................... 356/350
[58] Field of Search ............................... 356/350, 351

[56] References Cited

U.S. PATENT DOCUMENTS

| 3,328,595 | 6/1967 | Todd, Jr. ...................... 250/231 GY |
| 3,778,163 | 12/1973 | Forward ........................ 250/231 GY |
| 3,915,019 | 10/1975 | Zoltan ........................... 250/231 GY |
| 4,120,588 | 10/1978 | Chaum ................................... 356/350 |
| 4,135,822 | 1/1979 | Ezekiel ................................... 356/350 |
| 4,273,445 | 6/1981 | Thompson et al. .................. 356/350 |

OTHER PUBLICATIONS

"Passive Ring Resonator Laser Gyroscope"; Ezekiel et al., Applied Physics Letters, vol. 30, No. 9, May 1, 1977, pp. 478–480.

"The Laser Gyro"; Killpatrick, IEEE Spectrum, vol. 4, Oct. 1967, pp. 44–53.

"Regenerative Circulatory Multiple-Beam Interferometer for the Study of Light-Propagation Effects", Rosenthal, J.O.S.A., vol. 52, No. 10, Oct. 1962, pp. 1143–1148.

Primary Examiner—Vincent P. McGraw
Attorney, Agent, or Firm—Kenway & Jenney

[57] ABSTRACT

A passive ring resonator laser gyro includes a thin film, passive waveguide adapted to provide a closed, substantially circular propagation path for optical signals. Couplers are provided for coupling coherent optical signals in opposite directions in the waveguide. Frequency controllers for each of the counter-rotating optical signals are adapted to adjust the frequencies of the respective signals in the waveguide to achieve resonance along the optical path encountered by each of the signals. Detectors provide signals representative of the frequency shifts of the two counter-rotating optical signals in the waveguide. These signals are nulled by servos which apply correcting frequencies to the frequency controllers. A difference network generates a rate signal corresponding to the difference in frequency between the signals applied to the controllers. The rate signal is representative of the angular rotation rate of the waveguide.

14 Claims, 3 Drawing Figures

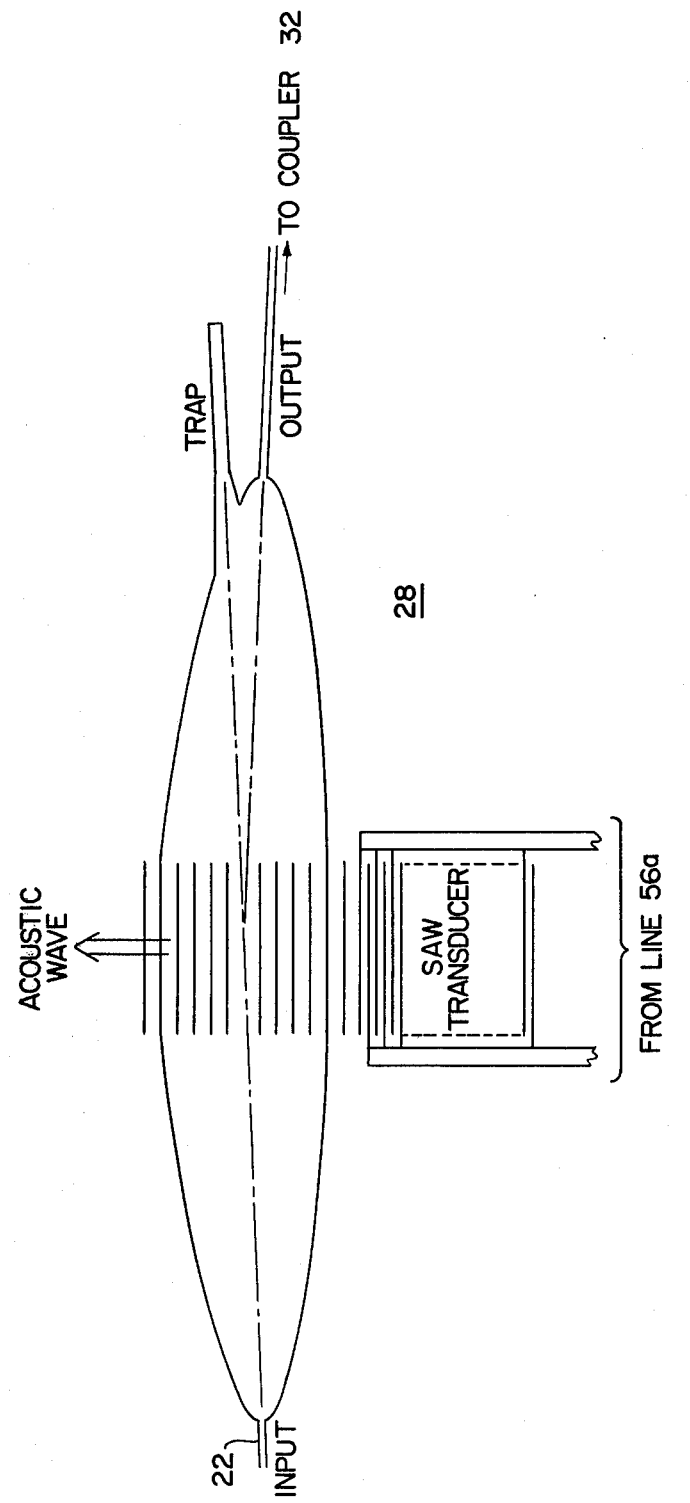

THIN FILM LASER GYRO

BACKGROUND OF THE INVENTION

The field of this invention is inertial instruments, and more particularly, laser gyros.

The Sagnac effect is well-known to define a linear relationship between the rate of rotation of a circuital waveguide, or loop, and the difference in frequency in oppositely directed electromagnetic wave disturbances travelling through that waveguide at resonance. For a circular waveguide, at resonance, this frequency difference $\Delta f$ is related to the rotational rate $\Omega$ normal to the plane of the waveguide loop in accordance with:

$$f = (4A/n\lambda P)\Omega$$

where A is the area of the loop, P is the perimeter of the loop, n is the refractive index of the material of the loop and $\lambda$ is the free-space wavelength of the wave.

In the prior art, ring lasers have used this principle to provide measurements of inertial rotation in active laser gyros. In such configurations, a ring laser generates two counter-propagating optical signals in a common planar cavity, generally established by three or more mirrors positioned about the laser. When the cavity is rotated with respect to inertial space perpendicular to the plane of the cavity, the effective path length for the two optical signals changes so that one signal encounters a relatively long effective optical path length, and the oppositely-directed signal encounters a relatively short effective optical path length. As the cavity rotates, the beats of the frequency difference for the counter-rotating signals provide a measure of the rate. However, such active laser gyros are affected by the phenomenon of lock-in of the two oppositely-directed optical signals at low rotation rates. In addition, substantial bias drift and scale factor variation are present due to the characteristics of the gain medium (i.e. the laser) within the ring cavity.

Passive laser gyros are also known in the art which avoid the lock-in problem encountered by active laser gyros. The conventional passive laser gyro includes a cavity for the counter-propagating optical signals made up of a plurality of reflecting surfaces or mirrors, with no active gain medium in that closed path. The counter-propagating optical signals are established by a pair of lasers external to the cavity. These signals are generally coupled into the cavity through partly-transmitting mirrors. Servo-loops may be used to vary the frequency of the two lasers to establish resonance in both directions in the cavity.

While this form of gyro avoids the lock-in problem encountered by the active laser gyro configurations, performance is still limited due to the fact that with two lasers, there are two sources of beam, or optical signal, instability. In addition, with the mirrored arrangement for establishing the cavity, the counter-rotating optical signals generally do not have precisely the same propagation paths in the cavity due to alignment errors in the mirrors which project the signals into the cavity.

U.S. Pat. No. 4,135,822 illustrates another form of passive ring resonator laser gyro known in the prior art. This form is similar to the above-described passive configuration, but uses a single laser and a beam splitter to provide the two counter-rotating optical signals. In this form, a pair of servo-loops are used in conjunction with frequency shifters (such as Bragg cells) for each portion of the split beam from the laser. The frequency shifters control the frequencies of the counter-rotating optical signals to achieve resonance during rotation. By way of example, the servo loop for one signal might assure resonance for one of the optical signals by varying the position of one of the mirrors in the cavity by means of a piezoelectric crystal, while maintaining a constant Bragg cell drive frequency for that signal. The other servo loop might utilize a Bragg cell to control the frequency of the second optical signal to achieve resonance.

In this form, a single laser is thus used to avoid the multiple source of instability established by two lasers in the previous passive laser gyro configurations. In addition, the lock-in problem is also avoided. However, in this basic configuration where the basic cavity is established by mirrors, it is not possible to have both counter rotating optical signals use precisely the same optical propagation path. In U.S. Pat. No. 4,135,822, it is suggested that a single optical fiber might alternatively be used to establish the cavity. While this approach would solve the problem of different optical paths, the losses encountered in joining the two ends of the fiber to establish the circuital cavity causes a serious degradation in performance. Further degradation is introduced by the requirement for coupling the optical signals to such optical fibers using currently known techniques.

Accordingly, it is an object of the present invention to provide an improved passive ring resonator laser gyro.

It is another object to provide an improved passive ring resonator laser gyro having a substantially common path for the counter-rotating optical signals.

SUMMARY OF THE INVENTION

In accordance with the invention, a thin film, passive waveguide provides a substantially closed circular propagation path for optical signals. A laser and associated beam splitter are adapted to generate two coherent optical signals. Directional couplers introduce the two optical signals to the waveguide in a manner establishing oppositely directed coherent optical signals in the waveguide. In one form of the invention, both optical signals are frequency-controlled so that these signals resonate within the waveguide.

By way of example, the frequency control for the optical signals may be achieved by use of acousto-optic modulators which shift the frequency of optical signals applied to them as a function of the frequency of an RF signal applied to the modulator. With this configuration, the optical signals from the laser and beam splitter pass along separate paths, through the frequency shifters, and directional couplers, and into the waveguide.

In addition, optical detectors and associated directional couplers are adapted to detect the intensity of the oppositely-directed optical signals in the waveguide. Servo networks responsive to the detectors generate the RF signals for controlling the frequencies of the optical signals (by way of the modulators) injected into the waveguide in the respective directions.

In this configuration, the waveguide resonator effectively provides a passive Fabry-Perot interferometer utilizing the Sagnac effect to provide a measure of rotation. With the thin film, optical waveguide configuration, the effective paths for the oppositely-directed optical signals are coincident, eliminating a substantial source of degradation of prior art devices.

Because the waveguide is passive in the present invention, the lock-in problems encountered by the prior art laser gyros are avoided. In addition, null shift and scale factor variations encountered in the prior art (due to the inclusion of active materials within the ring) are not present. The independent control of the frequency of the counter propagating waves in the waveguide provides the measure of the variation and resonance frequencies of the passive ring under conditions of inertial rotation. The use of a single source laser avoids the problem of uncorrellated phase jitter.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 3 shows a frequency shift device for use in the embodiment of FIG. 1.

DESCRIPTION OF THE PREFERRED EMBODIMENT

Figure 1:
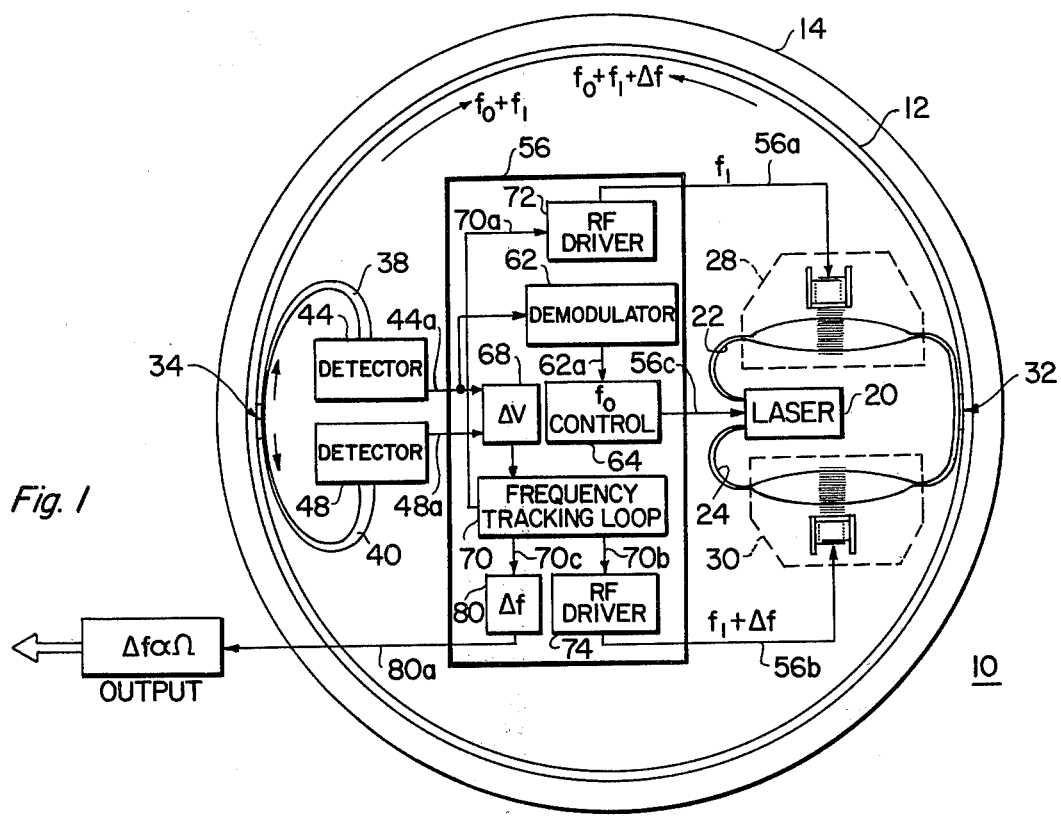
FIG. 1 shows a laser gyro in accordance with the present invention.

FIGS. 1 show embodiments of the present invention. In the configuration of FIG. 1, the gyro 10 includes a thin film, dielectric waveguide 12 defining a circular propagation path for optical signals. The waveguide 12 is disposed on a planar substrate 14. A controllable frequency laser 20 is also disposed on substrate 14. The laser 20 includes two output ports leading to thin film optical waveguides 22 and 24 for transmitting coherent optical signals from the laser. Waveguide 22 is coupled by way of a frequency shifter 28 to a directional coupler 32. Similarly, waveguide 24 is coupled by way of a second frequency shifter 30 to the directional coupler 32. The frequency shifters 28 and 30 may be conventional acousto-optic modulators, such as Bragg cells, as described more fully below.

The waveguides 22 and 24 and frequency shifters 28 and 30 are configured with respect to coupler 32 and the waveguide 12 so that optical signals travelling from the laser 20 by way of waveguide 22 are coupled to the waveguide 12 in a first direction (clockwise as shown in FIG. 1) and optical signals travelling from the laser 20 by way of waveguide 24 are coupled to the waveguide 12 in the opposite direction (counterclockwise as shown in FIG. 1). A second directional coupler 34 is disposed on the opposite side of the waveguide 12 from coupler 32. Thin film waveguides 38 and 40 extend from coupler 34 to detectors 44 and 48, respectively. The coupler 34, waveguide 38 and detector 48 are configured so that detector 48 receives a portion of a counterclockwise travelling optical signal in waveguide 12. Detector 48 in turn is responsive to that received signal to generate a signal on line 48a representative of the intensity of that counterclockwise optical signal in waveguide 12. Similarly, the coupler 34, waveguide 38 and detector 44 are configured so that detector 44 receives a portion of the clockwise-travelling optical signal in waveguide 12. Detector 44 is responsive to that received signal to generate a signal on line 44a representative of the intensity of the clockwise optical signal in waveguide 12.

A control network 56 is responsive to the signals from detectors 44 and 48 to provide control signals on line 56a and 56b for adjusting the frequency shift provided by shifters 28 and 30, respectively. In addition, the control network 56 provides a center frequency control signal on line 56c which adjustably controls the center frequency, $f_o$, of laser 20.

In the present embodiment, the control network 56 includes a demodulator 62 and an $f_o$ control network 64. The demodulator 62 is responsive to the intensity signal on line 44a to provide an output signal on line 62a proportional to the amplitude of the clockwise optical signal in the waveguide 12. The $f_o$ control network 64 generates the laser $f_o$ control signal on line 56c in response to the signal applied from line 62a in a closed-loop manner which maximizes the intensity of the clockwise signal in waveguide 12, thereby causing the optical signal along that path to achieve resonance.

The control network 56 also includes a difference amplifier 68, a frequency tracking loop 70 and a first RF driver 72 and a second RF driver 74. The frequency tracking loop 70 generates a frequency standard control signal which is applied by way of line 70a to RF driver 72, which in turn provides a fixed RF signal at frequency $f_1$ on line 56a to the frequency shifter 58. With this configuration, the clockwise wave in waveguide 12 is thereby controlled to be $f_o + f_1$.

In addition, the frequency tracking loop 70 is responsive to the output from the difference amplifier 68 (which detects the difference between the intensities of the counter propagating optical signals in waveguide 12) to provide a servo control signal on line 70b which minimizes this difference. The servo control signal for the tracking loop is applied by way of line 70b to variable frequency RF driver 74 which in turn provides an output RF signal on line 56b to frequency shifter 30 so that the counterclockwise optical signal has a frequency equal to a nominal frequency $f_o + f_1$ plus or minus an additional component $\Delta f$ which is necessary to shift the frequency of the counterclockwise optical signal in waveguide 12 to be resonant.

The control network 56 also provides an output signal on line 70c which is applied to a frequency comparator 80 which in turn provides an output signal on line 80a proportional to the difference in frequency of the RF signal control signals applied to the frequency shifters 28 and 30. This signal is proportional to the rotation of the waveguide 12. When the waveguide 12 is at rest in inertial space, $\Delta f$ equals 0; when waveguide 12 rotates about an axis normal to the plane of the waveguide, $\Delta f$ is proportional to the rate of turn in accordance with the Sagnac effect.

In operation, the laser frequency is modulated by the $f_o$ control 64. The amplitude of the frequency scan is maintained so that it scans across the resonator peak, from one inflection point to its opposite. The $f_o$ control 64 then examines the demodulated signal from detector 44 and determines whether the laser line and the resonator peak center are coincident. If an error signal is detected, indicating lack of coincidence, $f_o$ control 64 changes the laser frequency until centering is achieved. The frequency response of this loop extends from DC to relatively high frequency in order to maintain servo lock in the presence of disturbances including mechanical, acoustic vibrations and frequency jitter in the laser itself.

Once this servo loop is locked on the resonator peak for the path clockwise, the difference signal can be examined for rate information. The demodulator differential output rate signal ($\Delta V$) provided by network 68 drives a frequency tracking loop 70 that introduces a frequency shift ($\Delta f$) between the drive to the acousto-optic shifters operating on the CW and CCW signals. The direction and sign of $\Delta f$ are adjusted by the frequency tracking loop until the two peaks are brought back to complete overlap so that the waveguide in effect provides two interferometers which differ in path length but which, because of the differing wavelengths, both contain an integral number of wavelengths. When the $\Delta V$ is nulled, $\Delta f$ relates linearly to rate. The $\Delta f$, read out as the rate signal, is the difference frequency between the drives to the acousto-optic frequency shifters for the CW and CCW paths. A center frequency of 300 MHz for the shifters requires that the two oscillators maintain a stable frequency difference of as low as 1 Hz and, for high rate situations, as high as a few hundred KHz.

Figure 2:
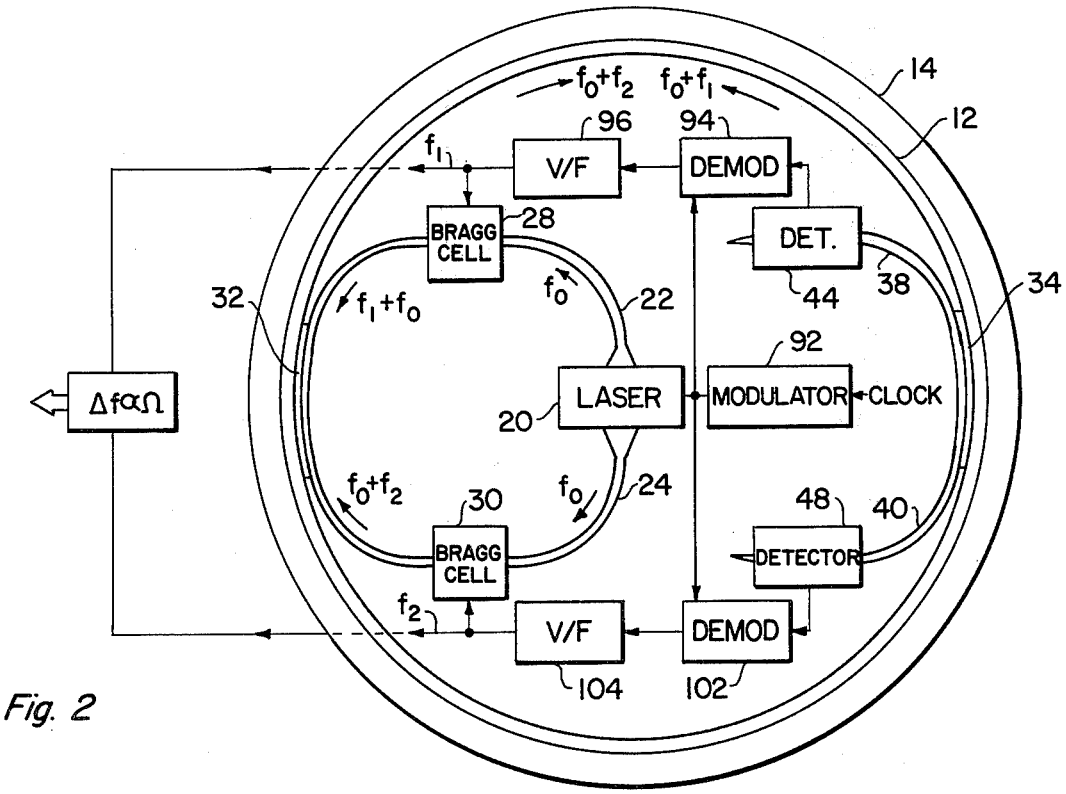
FIG. 2 shows an alternate embodiment of the present invention.

FIG. 2 shows an alternative embodiment where elements corresponding to elements in the embodiment of FIG. 1 are identified with the same reference designations. In the FIG. 2 configuration, the output from laser 20 is coupled by way of frequency shifters 28 and 30 and coupler 32 to waveguide 12. Portions of the counter rotating optical signals in waveguide 12 are applied by way of coupler 34 and waveguides 38 and 40 to detectors 44 and 48. The frequency of laser 20 is controlled by a clock signal and modulator 92. A first feedback network (including detector 44, demodulator 94 and voltage-to-frequency convertor 96) controls the frequency ($f_o+f_1$) of the counterclockwise signal in waveguide 12 by way of frequency shifter 28. A second feedback network (including detector 48, demodulator 102 and voltage-to-frequency convertor 104) controls the frequency ($f_o+f_2$) of the clock wise signal in waveguide 12 by way of frequency shifter 30. As long as $f_1$ and $f_2$ are derived from low jitter, RF oscillators, the frequency jitters in $f_o+f_1$ and $f_o+f_2$ are identical. The rate information may be determined by measuring the difference between the two frequencies $f_1$ and $f_2$. In alternative embodiments, the CW and CCW peaks could be scanned separately and the rate of rotation determined from the relative position in time of the occurrence of those peaks.

With this configuration, the measurement of the waveguide path length difference is accomplished by servoing $f_o+f_1$ for the counterclockwise optical signal in waveguide 12 to its resonant frequency in the waveguide (by means of the first electronic network which detects the intensity of that optical signal and then servos the frequency of the frequency shifter to maximize that intensity), and similarly, servoing $f_o+f_2$ for the clockwise optical signal to its resonant frequency. In this way, the difference $\Delta f$ between $f_1$ and $f_2$ is directly proportional to the inertial rotation rate of the waveguide about an axis normal to the plane of the waveguide. Again, when the gyro is at rest in inertial space, $\Delta f=0$ and both optical paths have the same resonant frequency. A component of the rotation normal to the plane of the waveguide will cause $\Delta f$ to be non-zero.

In the preferred embodiment of FIG. 1, the passive waveguide 12 is a 10 cm ring having a 4 um width and 1 um thickness. The waveguide 12 is constructed on a glass or quartz substrate 12 by establishing a localized, relatively high index of refraction region in an optical material on the substrate 14 through the use of photolocking techniques. The initial step in this procedure is to prepare a liquid polymer that has been doped with a monomer and photosensitizer. The mixture is deposited on a substrate by spinning or draining. The doped film is then exposed to ultraviolet light either by laser writing or exposure through a mask. The energy absorbed becomes available to the monomer for polymerizing, dimerizing or attaching to the host polymer. All such reactions tend to immobilize the volatile monomer in the irradiated region. Following exposure, the film is heat treated to drive off the unreacted monomers. Since the monomer had a higher refractive index than the host polymer, the irradiated region would be a region of higher refracted index. The increase in refractive index is controlled by the nature and amount of doping and the total exposure energy. By way of example, the techniques disclosed by Chandross, et al. (APPL. PHYS. LETT., Vol. 24, No. 2, Jan. 15, 1974) are suitable for providing low-loss dielectric optical waveguides having width on the order of four micrometers, guiding in a single mode.

With this technique, waveguides of very precisely controlled dimensions may be generated without the need of subsidiary mechanical procedures (e.g. mask fabrication), avoiding the attendant edge irregularities in the waveguide. For constructing the waveguide on the preferred embodiment, the polymer coated substrate is mounted on a rotary table with translation capability. The UV light from a He-Cd laser passes through a beam expanding auto-collimator, and is deflected 90° by a mirror and focused on the polymer film. The beam may be then controlled with respect to the substrate (through motion of the rotary and translational table) so that the desired circular waveguide shape is scribed on the substrate. By way of example, relatively low loss (less than 1 db/cm) waveguides may be constructed in this manner from polycarbonate with polymethyl methacrylate dopant, or alternatively, with methyl methacrylate and glycol methacrylate with ethyl naptha-acrylate.

In alternate embodiments, the waveguide 12 may be constructed by other techniques, including vacuum evaporation, sputtering, chemical vapor deposition, plasma polymerization and spinning/dipping, where a relatively high index of refraction film is deposited on a substrate.

In the preferred form, the laser 20 is a semiconductor laser diode with distributed Bragg reflectors for wavelength stabilization and a servo loop controlling the injection current to stabilize the frequency so that it coincides with the resonance peak of the ring waveguide. Such a laser would be adapted to operate CW in a stable single transverse mode. In particular, laser 20 may be a lithium neodymium tetraphosphate (LiNaP$_4$O$_{12}$) laser which provides stable CW operation at 1.047 um in a single longitudinal and single transverse mode when pumped with an argon laser at 5145 angstroms, or by light emitting diodes.

In the embodiments of FIGS. 1 and 2, the frequency shifters 28 and 30 are acousto-optic modulators in the form of Bragg cells. For frequency shifter 28, as shown in FIG. 3, a surface acoustic wave (SAW) transducer is responsive to an input signal (from line 56a) to generate a surface acousic wave across the planar, surface waveguide (22) in a direction nearly normal (but offset by the Bragg angle) to the propagation direction through the waveguide. The optical signal waveguide 22 interacts with the SAW (due to the diffraction-grating-like effect of the periodic variation in refractive index caused by the acoustically-induced strain in the waveguide), to generate an output signal which is shifted in frequency by the frequency of the SAW and shift in direction by twice the Bragg scattering angle. This output signal is then coupled to the directional coupler 32.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A passive ring resonator laser gyro, comprising:
   A. ring means including a thin film, passive waveguide adapted to provide a closed, passive propagation path for optical signals,
   B. means for coupling first and second coherent optical signals into said waveguide, said optical signals being oppositely directed in said waveguide and having frequencies $f_1$ and $f_2$, respectively,
   C. means for controlling the frequencies of said two optical signals whereby said waveguide is resonant at frequency $f_1$ and at frequency $f_2$ for said first and second optical signals, respectively,
   D. means for generating a rate signal representative of the difference in frequency of said first and second optical signals in said waveguide, whereby said rate signal is representative of the angular rate of said waveguide.

2. A gyro according to claim 1 further comprising a means for generating said first and second coherent optical signals including:
   a laser means for generating a coherent light beam,
   a beam splitting means for splitting said beam into two beams,
   wherein said frequency control means includes:
   means for shifting the frequency of a first of said split beams in response to a first control signal to provide said first optical signal.

3. A gyro according to claim 2 wherein said frequency shifting means for said first split beam includes an acousto-optical modulator external to said laser.

4. A gyro according to claim 2 wherein said frequency control means further includes:
   means for shifting the frequency of the second of said split beams in response to a second control signal to provide said second optical signal.

5. A gyro according to claim 2 wherein said frequency control means further includes:
   means for shifting the frequency of said optical beam in response to a second control signal whereby the second of said split beams corresponds to said second optical signal.

6. A gyro according to claim 5 wherein said frequency shifting means for said optical beam includes an acousto-optical modulator external to said laser.

7. A gyro according to claim 4 wherein said frequency shifting means for said optical beam includes an acousto-optical modulator external to said laser.

8. A gyro according to claim 5 wherein said frequency shifting means for said optical beam includes a means associated with said laser means for controlling the frequency of said beam.

9. A gyro according to claim 2 wherein said frequency control means further includes:
   first detector means for generating a first signal representative of the intensity of said first optical signal in said waveguide, and
   first feedback network responsive to said first signal to generate said first control signal, whereby the intensity of said first optical signal in said waveguide is maximized.

10. A gyro according to claim 4 wherein said frequency control means further includes:
    first detector means for generating a first signal representative of the intensity of said first optical signal in said waveguide, and
    first feedback network responsive to said first signal to generate said first control signal, whereby the intensity of said first optical signal in said waveguide is maximized.

11. A gyro according to claim 10 wherein said frequency control means further includes:
    second detector means for generating a second signal representative of the intensity of said second optical signal in said waveguide, and
    second feedback network responsive to said second signal to generate said second control signal, whereby the intensity of said second optical signal in said waveguide is maximized.

12. A gyro according to claim 5 wherein said frequency control means further includes:
    first detector means for generating a first signal representative of the intensity of said first optical signal in said waveguide, and
    first feedback network responsive to said first signal to generate said first control signal, whereby the intensity of said first optical signal in said waveguide is maximized.

13. A gyro according to claim 12 wherein said frequency control means further includes:
    second detector means for generating a second signal representative of the intensity of said second optical signal in said waveguide, and
    second feedback network responsive to said second signal to generate said second control signal, whereby the intensity of said second optical signal in said waveguide is maximized.

14. A passive ring resonator laser gyro comprising:
    A. ring means including a thin film, passive waveguide adapted to provide a closed, substantially circular propagation path for optical signals,
    B. means for generating first and second coherent, optical signals at substantially one frequency,
    C. means for shifting the frequency of said first optical signal in response to a first control signal,
    D. means for shifting the frequency of said second optical signal in response to a second control signal,
    E. first directional coupling means for coupling said first optical signal having said shifted frequency to said waveguide whereby said signal travels in said waveguide in a first direction,
    F. second directional coupling means for coupling said second optical signal having said shifted frequency to said waveguide whereby said signal travels in said waveguide in a direction opposite to said first direction,
    G. first detector means for generating a first signal representative of the intensity of said first optical signal in said waveguide, H. second detector means for generating a second signal representative of said intensity of said second optical signal in said waveguide,
I. first feedback network responsive to said first signal to generate said first control signal whereby the intensity of said first optical signal in said waveguide is maximized,
J. second feedback network responsive to said second signal to generate said second control signal whereby the intensity of said second optical signal in said waveguide is maximized,
K. means for generating a signal representative of the difference in frequencies of said first and second optical signals in said waveguide.

* * * * *